(12) United States Patent
Talwar et al.

(10) Patent No.: US 10,339,927 B2
(45) Date of Patent: Jul. 2, 2019

(54) VEHICLE CONTROL SYSTEMS AND METHODS FOR MULTI-INTENT QUERIES INPUT BY VOICE

(71) Applicant: GM Global Technology Operations LLC, Detroit, MI (US)

(72) Inventors: Gaurav Talwar, Novi, MI (US); Xu Fang Zhao, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 15/434,506

(22) Filed: Feb. 16, 2017

(65) Prior Publication Data

US 2018/0233138 A1  Aug. 16, 2018

(51) Int. Cl.

| G10L 15/00 | (2013.01) |
| G10L 15/26 | (2006.01) |
| G10L 21/00 | (2013.01) |
| G10L 25/00 | (2013.01) |
| G10L 21/06 | (2013.01) |
| G10L 15/22 | (2006.01) |
| G10L 15/18 | (2013.01) |
| G06F 3/16 | (2006.01) |

(52) U.S. Cl.
CPC .......... *G10L 15/22* (2013.01); *G10L 15/1822* (2013.01); *G06F 3/167* (2013.01); *G10L 2015/223* (2013.01)

(58) Field of Classification Search
CPC ......... G10L 15/08; G10L 15/26; G10L 15/30; G10L 15/32; G10L 17/22; G10L 15/1822; G10L 15/01; G10L 15/265
See application file for complete search history.

(56) References Cited

U.S. PATENT DOCUMENTS

| 10,083,685 | B2 * | 9/2018 | Zhao | G10L 15/22 |
| 2008/0126091 | A1 * | 5/2008 | Clark | G10L 15/22 704/246 |
| 2010/0217604 | A1 * | 8/2010 | Baldwin | G06Q 30/02 704/275 |
| 2012/0245934 | A1 * | 9/2012 | Talwar | G10L 15/22 704/235 |
| 2014/0067392 | A1 * | 3/2014 | Burke | G10L 15/22 704/236 |
| 2014/0365209 | A1 * | 12/2014 | Evermann | G06F 17/279 704/9 |

(Continued)

*Primary Examiner* — Olujimi A Adesanya

(57) ABSTRACT

An infotainment system of a vehicle includes: a primary intent module configured to determine a primary intent included in voice input using automated speech recognition (ASR); and an execution module configured to, via a first hardware output device of the vehicle, execute the primary intent. A secondary intent module is configured to: based on the primary intent, determine a first domain of the primary intent; based on the first domain of the primary intent, determine a second domain; and based on the voice input and the second domain, determine a secondary intent included in the voice input using ASR. A display control module is configured to display a request for user input indicative of whether to execute the secondary intent. The execution module is further configured to, via a second hardware output device of the vehicle, execute the secondary intent in response to user input to execute the secondary intent.

14 Claims, 3 Drawing Sheets

(56) References Cited

U.S. PATENT DOCUMENTS

| | | | | |
|---|---|---|---|---|
| 2015/0142447 A1* | 5/2015 | Kennewick | ......... | G10L 15/1822 |
| | | | | 704/275 |
| 2015/0370787 A1* | 12/2015 | Akbacak | ............ | G06F 17/2836 |
| | | | | 704/2 |
| 2015/0379987 A1* | 12/2015 | Panainte | ................. | H04R 1/08 |
| | | | | 704/246 |
| 2016/0351194 A1* | 12/2016 | Gao | ........................ | G10L 15/26 |

* cited by examiner

VEHICLE CONTROL SYSTEMS AND METHODS FOR MULTI-INTENT QUERIES INPUT BY VOICE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to audio/visual (AV) systems of vehicles.

Vehicles include one or more torque producing devices, such as an internal combustion engine and/or an electric motor. A passenger of a vehicle rides within a passenger cabin (or passenger compartment) of the vehicle.

An infotainment system of a vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

SUMMARY

In a feature, an infotainment system of a vehicle includes: a voice module configured to, in response to user input, record a voice input received via a microphone; a primary intent module configured to determine a primary intent included in the voice input using automated speech recognition (ASR); and an execution module configured to, via a first hardware output device of the vehicle, execute the primary intent. A secondary intent module is configured to: based on the primary intent, determine a first domain of the primary intent; based on the first domain of the primary intent, determine a second domain; and based on the voice input and the second domain, determine a secondary intent included in the voice input using ASR. A display control module is configured to display a request for user input indicative of whether to execute the secondary intent. The execution module is further configured to, via a second hardware output device of the vehicle, execute the secondary intent in response to user input to execute the secondary intent.

In further features, the secondary intent is one of a plurality of predetermined intents associated with the second domain.

In further features, the primary intent is one of a plurality of predetermined intents associated with the first domain.

In further features, the secondary intent module is configured to, based on the first domain of the primary intent, determine the second domain using a probabilities index including probabilities for second domains indexed by first domains.

In further features, the secondary intent module is configured to: from the probabilities index, based on the first domain, identify one of the second domains having a highest probability; and set the second domain to the one of the second domains having the highest probability.

In further features, the secondary intent module is further configured to: in response to user denial of the secondary intent, based on the first domain of the primary intent, determine a third domain; and based on the voice input and the third domain, determine a possible secondary intent included in the voice input using ASR. The display control module is further configured to display a second request for second user input indicative of whether to execute the possible secondary intent.

In further features, the secondary intent module is configured to: based on the first domain, from the probabilities index, identify a second one of the second domains having a second highest probability; and set the third domain to the second one of the second domains having the second highest probability.

In further features, the display control module is configured to display the request for user input indicative of whether to execute the secondary intent after completion of the execution of the primary intent.

In further features, the first hardware output device and the second hardware output device each include one of: one or more speakers of the vehicle; the display; a wireless transceiver; and a climate control actuator.

In further features, the primary intent module determines the primary intent based on the primary intent being included in the voice input before the secondary intent.

In a feature, an infotainment method for a vehicle includes: in response to user input to the vehicle, by one or more processors of the vehicle, recording a voice input received via a microphone; determining, by the one or more processors, a primary intent included in the voice input using automated speech recognition (ASR); by the one or more processors, via a first hardware output device of the vehicle, executing the primary intent; by the one or more processors, based on the primary intent, determining a first domain of the primary intent; by the one or more processors, based on the first domain of the primary intent, determining a second domain; by the one or more processors, based on the voice input and the second domain, determining a secondary intent included in the voice input using ASR; by the one or more processors, displaying a request for user input indicative of whether to execute the secondary intent; and by the one or more processors, via a second hardware output device of the vehicle, executing the secondary intent in response to user input to execute the secondary intent.

In further features, the secondary intent is one of a plurality of predetermined intents associated with the second domain.

In further features, the primary intent is one of a plurality of predetermined intents associated with the first domain.

In further features, determining the second domain includes, by the one or more processors, based on the first domain of the primary intent, determining the second domain using a probabilities index including probabilities for second domains indexed by first domains.

In further features, determining the second domain includes: by the one or more processors, from the probabilities index, based on the first domain, identifying one of the second domains having a highest probability; and by the one or more processors, setting the second domain to the one of the second domains having the highest probability.

In further features, the infotainment method further includes: by the one or more processors, in response to user denial of the secondary intent, based on the first domain of the primary intent, determining a third domain; by the one or more processors, based on the voice input and the third domain, determining a possible secondary intent included in the voice input using ASR; and by the one or more processors, displaying a second request for second user input indicative of whether to execute the possible secondary intent.

In further features, determining the third domain includes: by the one or more processors, based on the first domain, from the probabilities index, identifying a second one of the second domains having a second highest probability; and by the one or more processors, setting the third domain to the second one of the second domains having the second highest probability.

In further features, displaying the request for user input indicative of whether to execute the secondary intent includes displaying the request for user input indicative of whether to execute the secondary intent after completion of the execution of the primary intent.

In further features, the first hardware output device and the second hardware output device each include one of: one or more speakers of the vehicle; the display; a wireless transceiver; and a climate control actuator.

In further features, determining the primary intent includes determining the primary intent based on the primary intent being included in the voice input before the secondary intent.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An infotainment system of a vehicle controls various aspects of in-vehicle entertainment and communication. For example, an infotainment module of a vehicle may control volume of sound output via speakers within the vehicle, selection of a source of sound output via the speakers, information displayed on a display within the vehicle, climate control settings of the vehicle, etc.

Users can control the infotainment module via physically interacting with the infotainment module, such as by touching the display and/or actuating various physical user input devices, such as buttons, knobs, and switches. Users can also control the infotainment module by voice, such as via a microphone of the vehicle or via a microphone of a mobile device wirelessly connected with the vehicle.

Under some circumstances, users may input a single request by voice for execution by the infotainment module. For example, a user may speak "turn up the radio," which includes a request for performance of a single function by the infotainment module. In response to the voice request, the infotainment module increases the volume of sound output via the speakers.

Under other circumstances, however, users may input two or more requests by voice. Voice input including two or more requests for execution by the infotainment module may be referred to as multi input queries (or requests). For example, a user may speak "turn down the radio and call Mom." This includes a request for performance of two functions by the infotainment module, first to turn down the radio and second to call a contact named Mom. Infotainment modules, however, may only consider single input voice requests, for example, to minimize complexity and prevent execution of unintended and/or unrequested functions.

Each request is associated with one of a plurality of domains. For example, requests to perform calls may be associated with a "calling" domain, while requests regarding sound output of the radio may be associated with an "audio" domain. According to the present disclosure, when a multi-intent query is received by voice, the infotainment module determines a first (or primary) request (or function) included in the multi-intent query. Based on a first domain associated with the first request, the infotainment module determines a second domain that the user is statistically likely to next transition to from a stored index of statistical probabilities for second domains indexed by first domains. The infotainment module determines a second (or secondary) request included in the multi-intent query based on matching between the multi-intent query and the predetermined requests associated with the second domain.

The infotainment module allows the user to confirm or deny execution of the second request after execution of the first request. This may improve request completion of the infotainment module and performance of the infotainment module, as perceived by the user.

Figure 1:
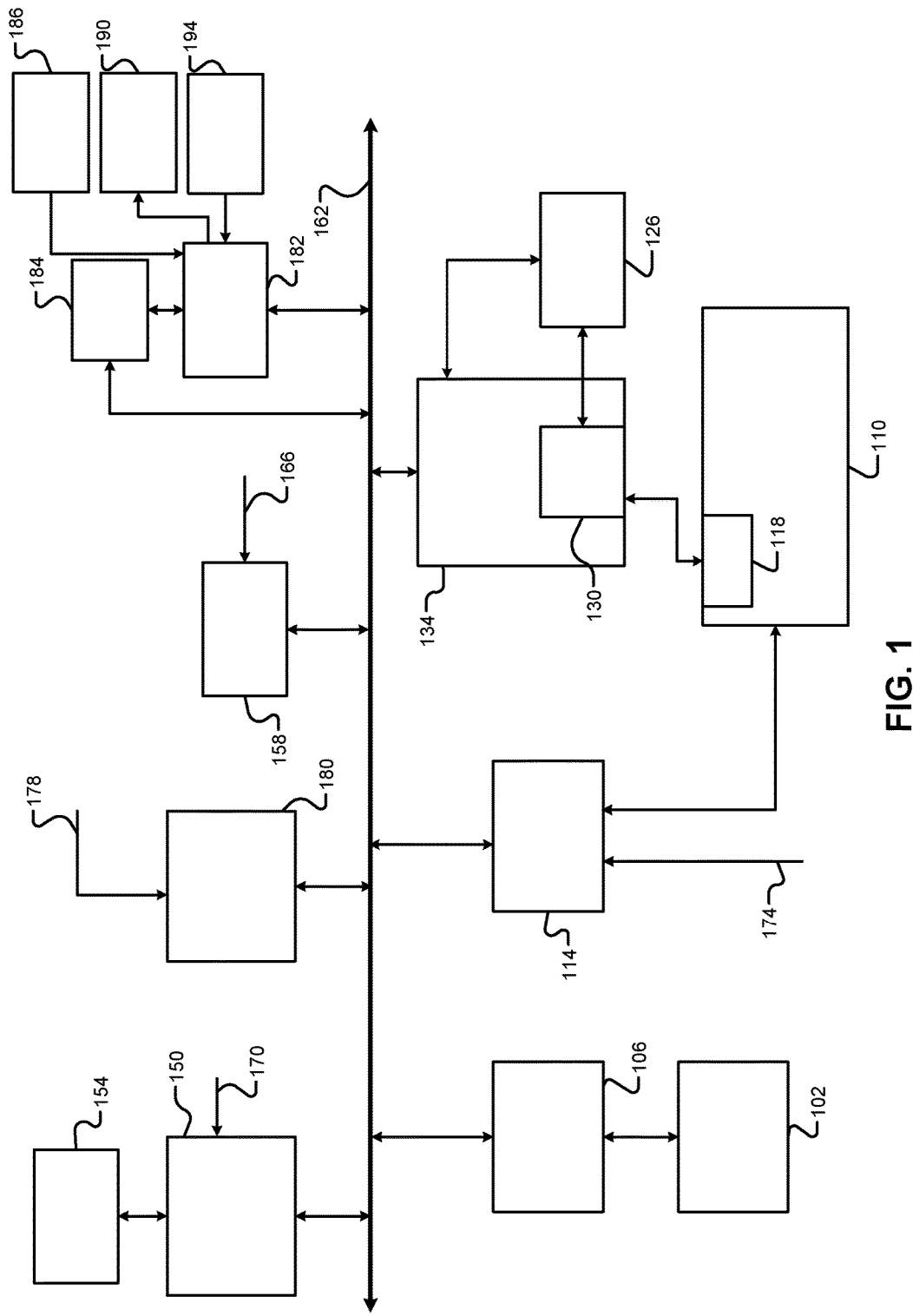
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

An electronic brake control module (EBCM) 150 may selectively control brakes 154 of the vehicle. A user interface module (UIM) 158 may provide one or more driver inputs to a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system also includes an infotainment module 182. The infotainment module 182 displays various information on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 186, such as one or more switches, buttons, knobs, etc.

The infotainment module 182 may also generate output via one or more other devices. For example, the infotainment module 182 may output sound via one or more speakers 190 of the vehicle. The infotainment module 182 also receives voice input and comments from users of the vehicle via a microphone 194 of the vehicle. While the example of a single microphone is provided, the infotainment module 182 may receive voice input via two or more microphones. Additionally or alternatively to receiving voice input via the microphone 194 of the vehicle, the infotainment module 182 may receive voice input via one or more mobile devices that are paired or connected with the infotainment module 182. The vehicle may include one or more additional control modules that are not shown, such as a chassis control module, a battery pack control module, etc. The vehicle may omit one or more of the control modules shown and discussed.

Figure 2:
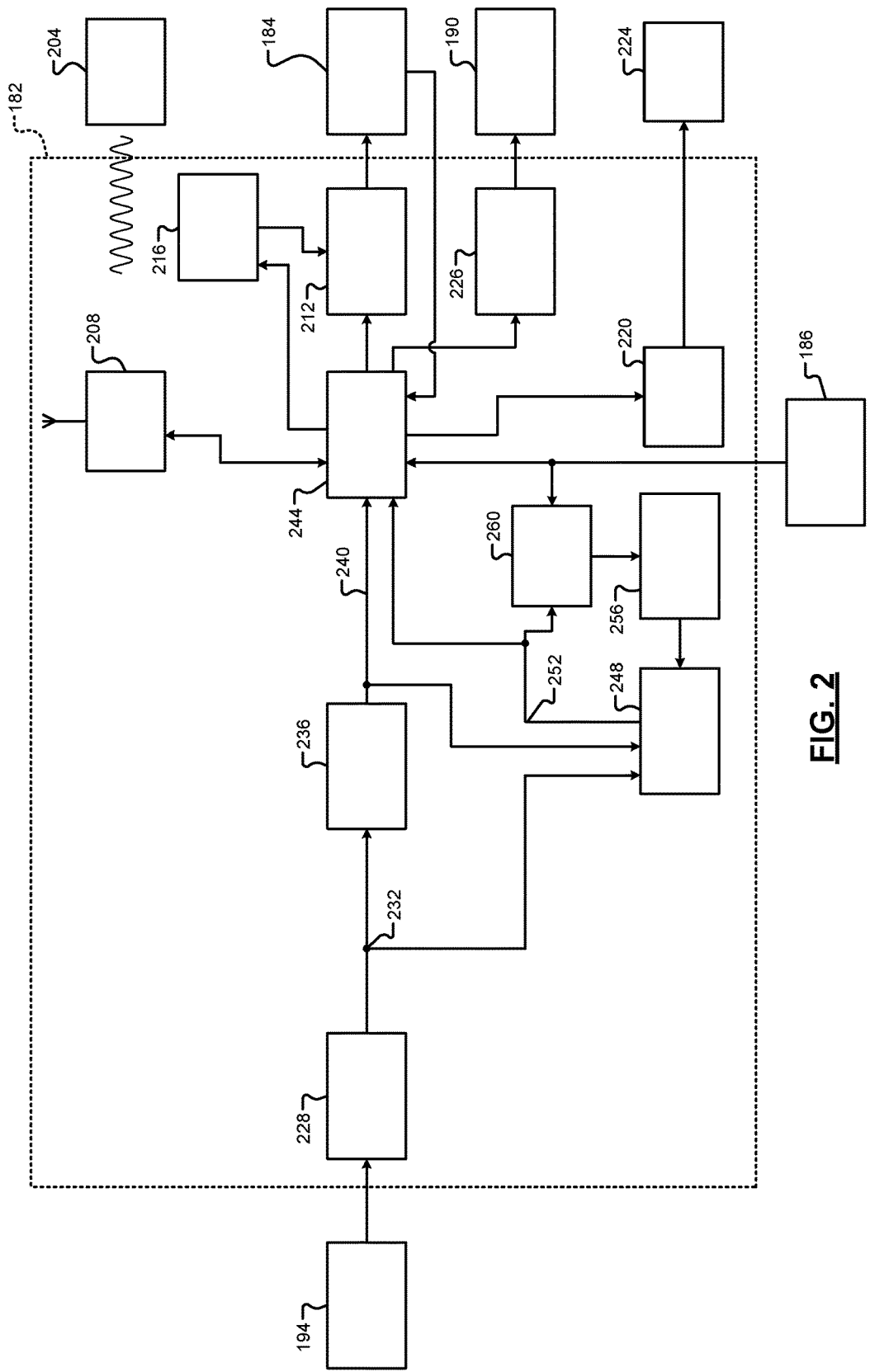
FIG. 2 is a functional block diagram of an example infotainment module of a vehicle.

Referring now to FIG. 2, a functional block diagram of an example implementation of the infotainment module 182 is presented. A mobile device 204 may establish a wireless connection/communication channel with the infotainment module 182 via a Bluetooth module 208. The Bluetooth module 208 may include a Bluetooth antenna and a Bluetooth transceiver. The mobile device 204 may be, for example, a tablet, a smart phone, a wearable computing device, or another type of mobile computing device that communicates wirelessly with the Bluetooth module 208 and with a cellular network. While the example of the Bluetooth module 208 is provided, the infotainment module 182 may additionally or alternatively establish a wireless connection/communication channel with mobile devices using another type of wireless communication.

A display control module 212 controls information displayed on the display 184. For example, the display control module 212 may display requests for confirmation of user commands, navigation information provided by a navigation module 216, and other types of information. The navigation information may include, for example, an indicator of a location of the vehicle on a map of roadways within a predetermined area. Locations of one or more points of interest (POIs) may also be included on the map.

The display control module 212 may also display climate control information regarding climate control settings of the vehicle, audio information, and other types of information on the display 184. The climate control settings may include, for example, whether heating is being performed for the passenger cabin of the vehicle, whether cooling is being performed for the passenger cabin of the vehicle, a target temperature for one or more locations (e.g., seats or rows of seats), one or more fan speeds, and one or more locations where heated or cooled air is being output (e.g., toward the windshield, toward the floor, or between the windshield and the floor). A climate control module 220 controls climate control actuators 224 of the vehicle based on user input regarding the climate control settings. The user input may be in the form of user touching, user voice, a combination of user touching and user voice, or both. The climate control actuators 224 may include, for example, the one or more fans, one or more actuators (e.g., damper doors) that control the direction of airflow from the fans into the passenger cabin, and one or more other climate control actuators.

An audio control module 226 may control sound output via the speakers 190 of the vehicle. The audio information may include, for example, a current station being tuned to, volume, current song information, and/or other types of information regarding audio output. Possible stations may include, for example, amplitude modulation (AM) stations, frequency modulation (FM) stations, and satellite radio stations.

Using voice, a user of the vehicle can request various actions be performed by the vehicle and/or by the mobile device 204. A voice module 228 generates a voice input 232 based on signals received from the microphone 194. For example, the voice module 228 may generate the voice input 232 (e.g., file) by recording the output of the microphone 194 during a period when the user has actuated a user input device, such as a button or switch, associated with a voice input. The voice module 228 may begin the recording when the user actuates the user input device for less than a predetermined period and may end the recording, for example, a predetermined period after the user stops speaking. The voice module 228 may perform a voice to text conversion (e.g., using a speech to text algorithm) such that the voice input 232 includes text words corresponding to the words spoken by the user.

One or more user requests may be included within the voice input 232. User requests may also be referred to as user intents. A voice input including multiple user requests (or intents) may be referred to as a multi-intent query. Examples of multi-intent queries include, but are not limited to:

"Can you turn on my seat vibrator to medium setting and play a jazz station from the radio";

"Can you turn the temperature down and tell me how stock for company X is doing";

"Cancel my calendar event for today and search for parks near me";

"Cancel my meeting scheduled for today and reschedule it for tomorrow at 2:00"; and "Check my calendar for meetings tomorrow and email Charlie—free for lunch tomorrow".

Each of the examples above includes multiple intents or requests. For example, the first example includes one request to turn the seat vibrator to the medium setting and another request to play a jazz station from the radio. Some voice inputs, however, may only include one intent or request.

A primary intent module 236 determines a primary intent 240 of the voice input 232 based on the voice input 232. For example, the primary intent module 236 may execute a finite state grammar (FSG) algorithm, a natural language understanding (NLU) algorithm, and/or an automated speech recognition (ASR) algorithm on the voice input 232 to identify the primary intent 240 of the voice input 232. The primary intent 240 may be, for example, a first request or intent spoken by the user. For example, based on the multi-intent query "call Tina and turn down the radio," the primary intent module 236 may determine that the primary intent 240 is "call Tina" because the user spoke "call Tina" before speaking "turn down the radio".

In various implementations, the primary intent 240 may be one intent of a multi-intent query that would logically be performed first. For example, based on the multi-intent query "call Tina and turn down the radio," the primary intent module 236 may determine that the primary intent 240 is "turn down the radio" because a user would likely want to "turn down the radio" before calling Tina.

The primary intent module 236 transmits the primary intent 240 to an execution module 244. The execution module 244 transmits a command to execute the primary intent 240 to the appropriate receiver, thereby executing the primary intent 240.

For example, for a primary intent to pair the mobile device 204, the execution module 244 transmits a command to the Bluetooth module 208 to initiate a pairing between the mobile device 204 and the Bluetooth module 208. As another example, for a primary intent to turn the temperature down, the execution module 244 transmits a command to the climate control module 220 to decrease a target temperature within the passenger cabin and to adjust one or more of the climate control actuators 224 accordingly. As another example, for a primary intent to call Tina, the execution module 244 may command the mobile device 204 (via the Bluetooth module 208) to call a contact stored in the mobile device 204 named Tina via a cellular network connected to the mobile device 204. Alternatively, the execution module 244 may command a cellular device of the vehicle to call Tina via a cellular network. Contact information for Tina may be requested from the mobile device 204 or retrieved from memory of the vehicle. As another example, for a primary intent to cancel my calendar event for today, the execution module 244 may command the mobile device 204 to delete an entry appearing today in a calendar maintained using the mobile device 204. Alternatively, the calendar may be maintained in the vehicle. Other examples of primary intents are also possible. The display control module 212 may display a confirmation of the action taken and/or an indication of the action taken on the display 184.

In various implementations, in response to a user actuation of the user input device for greater than the predetermined period while the mobile device 204 is paired, the execution module 244 may transmit the voice input 232 to the mobile device 204 and the mobile device 204 may relay the voice input 232 to a remote server. The remote server may determine the primary intent 240 and return the primary intent 240 to the execution module 244 via the mobile device 204.

As stated above, the voice input 232 may include one or more additional intents in the case of a multi-intent query. A secondary intent module 248 determines a secondary intent 252 of the voice input 232 based on the voice input 232, the primary intent 240, and a probabilities index 256. When the secondary intent module 248 determines that the voice input 232 includes only the primary intent 240, the secondary intent module 248 may set the secondary intent 252 to indicate that there is no secondary intent. The secondary intent 252 may correspond to a requested action to be taken after completion of the primary intent 240.

The probabilities index 256 includes an index (e.g., a lookup table) of statistical probabilities of transitioning from one domain to another domain. Each domain is associated with a specific feature and possible actions that are associated with that feature. Examples of domains include, but are not limited to, an audio-media domain, a Bluetooth pairing domain, a business information domain, a calendar domain, a calling domain, a climate control domain, a driver notifications domain, an embedded applications domain, an entertainment domain, a general command domain, a help domain, a how to domain, a knowledge domain, a messaging domain, a navigation domain, a parking domain, a personal assistant domain, a radio domain, a reminders and lists domain, a social media domain, a sports domain, a status domain, a stocks domain, a system settings domain, a news (or top stories) domain, a weather domain, and a traffic domain. These domains, however, are examples only. Other domains and/or domains having other names are possible. Each domain includes a plurality of predetermined intents. Each intent (e.g., the primary intent 240 and the secondary intent 252) falls within one of the domains.

For each domain, a statistical probability of transitioning to each one of the domains is stored in the probabilities index 256. An example portion of an example probabilities index is provided below. A complete probabilities index would include additional columns for each other domain.

| Primary Domain | Audio-Media | Bluetooth Pairing | Business Information | Calendar | Calling | Climate Control |
|---|---|---|---|---|---|---|
| Audio-Media | % | % | % | % | % | % |
| Bluetooth Pairing | % | % | % | % | % | % |
| Business Information | % | % | % | % | % | % |
| Calendar | % | % | % | % | % | % |
| Calling | % | % | % | % | % | % |
| Climate Control | % | % | % | % | % | % |
| Driver Notifications | % | % | % | % | % | % |
| Embedded Apps | % | % | % | % | % | % |

-continued

| Primary Domain | Audio-Media | Bluetooth Pairing | Business Information | Calendar | Calling | Climate Control |
|---|---|---|---|---|---|---|
| Entertainment | % | % | % | % | % | % |
| General Command | % | % | % | % | % | % |
| Help | % | % | % | % | % | % |
| How To | % | % | % | % | % | % |
| Knowledge Q/A | % | % | % | % | % | % |
| Messaging | % | % | % | % | % | % |
| Navigation | % | % | % | % | % | % |
| Parking | % | % | % | % | % | % |
| Personal Assistant Q/A | % | % | % | % | % | % |
| Radio | % | % | % | % | % | % |
| Reminders & Lists | % | % | % | % | % | % |
| Social Media | % | % | % | % | % | % |
| Sports | % | % | % | % | % | % |
| Status & Query | % | % | % | % | % | % |
| Stocks | % | % | % | % | % | % |
| System Settings | % | % | % | % | % | % |
| Top Stories | % | % | % | % | % | % |
| Traffic | % | % | % | % | % | % |
| Weather | % | % | % | % | % | % |

Initially, the probabilities index 256 may be calibrated based on a collected set of test data indicative of how users are expected to, or did, transition from domain to domain. For example, the probabilities index 256 may be calibrated based on a set of data collected based on actual user transitions from domain to domain of a suitably sized number of different users. As discussed further below, however, the probabilities index 256 may be updated/adjusted based on user feedback to tailor the probabilities index 256 to one or more particular users of the vehicle. For example, if a user frequently calls a contact and sends a text message after the call is complete, the probabilities index 256 of the vehicle of the user can be updated to reflect the strong likelihood of the user transitioning from the intent associated with calling to the intent associated with messaging.

The primary intent 240 is associated with one of the domains. To determine the secondary intent 252 of the voice input 232, the secondary intent module 248 determines the one of the domains associated with the primary intent 240 and determines the one of the domains that has a highest probability of being transitioned to from the probabilities index 256. For example, the secondary intent module 248 may find the row of the probabilities index 256 for the one of the domains associated with the primary intent 240, identify one of the entries of the row including a highest probability (e.g., percentage) in the row. That one entry falls within one column that is associated with one of the domains having a highest probability of being transitioned to. While the example of the use of a row to determine a column is provided, a column could equally be used to determine a row for the one of the domains having the highest probability of being transitioned to. The secondary intent module 248 then determines the secondary intent 252 based on matching a secondary portion of the voice input 232 (e.g., the text or speech) with an intent of that one of the domains. The secondary portion of the voice input 232 may be a remainder of the voice input 232 that does not correspond to the primary intent 240. This may help re-ranking of recognition results and hypothesis formation such that more relevant results/hypotheses are ranked higher as the re-ranking depends on the probabilities from the probabilities index 256.

Once execution of the primary intent 240 is complete, the execution module 244 commands the display control module 212 to display a request on the display 184 for the user to confirm or deny execution of the action of the secondary intent 252. While the example of displaying the request on the display 184 is provided, user confirmation or denial may be requested in another way, such as audibly via the speakers 190. The user can confirm or deny execution of the secondary intent 252, for example, via the microphone 194 (e.g., by speaking "yes" or "no"), by touching the display 184, or via input to one or more of the user input devices 186.

In response to user confirmation of the secondary intent 252, the execution module 244 transmits a command to execute the secondary intent 252 to the appropriate receiver, thereby executing the secondary intent 252 via one or more hardware output device of the vehicle. Examples of executing intents are provided above in conjunction with execution of the primary intent 240. Examples of hardware output devices include, for example, the Bluetooth module 208, the display 184, the speakers 190, and the climate control actuators 224, and other hardware output devices that are controlled by the infotainment module 182. Examples of receivers include, for example, the display control module 212, the audio control module 226, the Bluetooth module 208, the climate control module 220, and other modules that control other hardware output devices.

In response to user denial of the secondary intent 252, the system may await another voice input or perform one or more other actions. For example, the secondary intent module 248 may determine possible secondary intents for the voice input 232 in different ones of the domains. All other domains, or only a subset (e.g., the next N of the domains with the highest probabilities of being transitioned to, where N is an integer greater than zero) may be considered. The secondary intent module 248 may determine the possible secondary intents based on matching the secondary portion of the voice input 232 (e.g., the text or speech) with an intent of those other domains.

The execution module 244 may command the display control module 212 to display a request on the display 184 for the user to confirm or deny execution of the actions of the possible secondary intents. The possible secondary intents may be displayed, for example, in descending order of probabilities of their respective domains. While the example of displaying the request on the display 184 is again provided, user confirmation or denial may be requested in another way, such as audibly via the speakers 190. The user can confirm or deny execution of one of the possible secondary intents, for example, via the microphone 194, by touching the display 184, or via input to one or more of the user input devices 186.

In response to user confirmation of one of the possible secondary intents, the execution module 244 transmits a command to execute the one of the possible secondary intents to the appropriate receiver, thereby executing the one of the possible secondary intents. Examples of executing intents are provided above in conjunction with execution of the primary intent 240. In response to user denial of the possible secondary intents, the system may await another voice input.

An adjusting module 260 selectively updates the probabilities index 256 based on user confirmation and/or denial of the secondary intent 252. For example, the adjusting module 260 may increment (e.g., by a first predetermined increment amount, such as 1 percent) the one of the entries of the probabilities index 256 (for the one of the domains having the highest probability of being transitioned to) in response to user confirmation of the secondary intent 252. The adjusting module 260 may decrement (e.g., by a first predetermined decrement amount, such as 1 percent) the one of the entries of the probabilities index 256 in response to user denial of the secondary intent 252. This may adapt the probabilities index 256 for the specific user and increase accuracy of secondary intents determined for the user based on past behavior of the user.

Additionally, the adjusting module 260 may selectively update the probabilities index 256 based on user confirmation of one of the possible secondary intents. For example, the adjusting module 260 may increment (e.g., by a second predetermined increment amount) the one of the entries of the probabilities index 256 (associated with that one of the possible secondary intents) in response to user confirmation of that one of the possible secondary intents. The second predetermined increment amount may be the same or less than the first predetermined increment amount. This may also adapt the probabilities index 256 for the specific user and increase accuracy of secondary intents determined for the user based on past behavior of the user.

Figure 3:
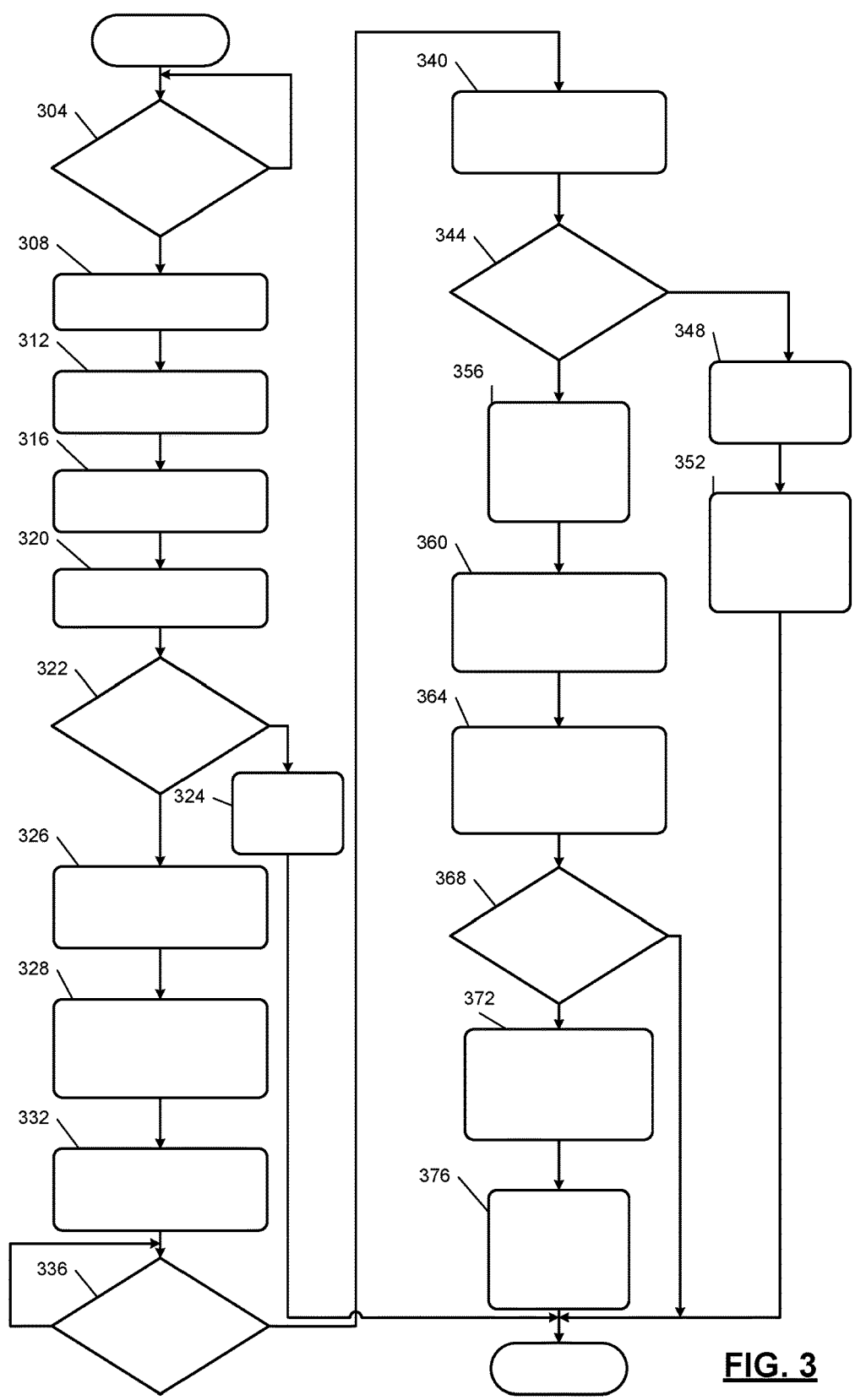
FIG. 3 is a flowchart depicting an example method of determining and executing intents of a multi input query.

FIG. 3 is a flowchart depicting an example method of determining and executing intents of a multi input query. Control begins with 304 where the voice module 228 determines whether user input has been received to input a voice input. For example, the voice module 228 may determine whether the user has actuated a user input device for less than a predetermined period. If 304 is true, control continues with 308. If 304 is false, control may remain at 304 or end.

At 308, the voice module 228 records the voice input 232 from the microphone 194. At 312, the voice module 228 may perform a speech to text conversion to convert spoken words into text words. At 316, the primary intent module 236 determines the primary intent 240 of the voice input 232 from the voice input 232. The primary intent 240 is associated with one of the domains.

At 320, the execution module 244 executes the primary intent 240 via one or more of the hardware output devices, such as the display 184, the speakers 190, the climate control actuators 224, and the Bluetooth module 208. At 322, the secondary intent module 248 determines whether the voice input 232 is a multi-intent query, that is, includes more than one intent. For example, the secondary intent module 248 may determine whether the voice input 232 is entirely for the primary intent 240. If 332 is false, the secondary intent module 248 indicates that the secondary intent 252 is not present at 324, and control may end. If 322 is true, control continues with 326.

At 326, the secondary intent module 248 determines the one of the domains with which the primary intent 240 is associated. Examples of domains are provided above. A listing of domains associated with intent may be stored in memory and used to determine the domain of the primary intent 240.

Based on the domain of the primary intent 240, the secondary intent module 248 determines the next most likely domain from the probabilities index 256 at 328. For example, the secondary intent module 248 identifies one of the entries in the row for the domain of the primary intent 240 having a highest probability and sets the next most likely domain to the domain of the column of that entry. The secondary intent module 248 sets the secondary intent 252 to one of the predetermined intents associated with the next most likely domain at 332, for example, by matching the remaining portion of the voice input 232 with the predetermined intents of the next most likely domain.

The execution module 244 may determine whether execution of the primary intent 240 is complete at 336. Some intents (e.g., change climate control settings, send a message, adjust volume of the radio) may be executed relatively quickly and not require the user to end the interaction while other intents (e.g., calls) may be longer and/or require a user to end the interaction. If 336 is true, control continues with 340. If 336 is false, control may remain at 336.

At 340, the display control module 212, at the request of the execution module 244, displays a request for user input indicative of whether to execute the secondary intent 252 on the display 184. At 344, the execution module 244 may determine whether the user has requested execution of the secondary intent 252. The user may request execution of the secondary intent 252, for example, by voice, via one of the user input devices 186, or via the display 184. If 344 is true, the execution module 244 executes the secondary intent 252 at 348 via one or more of the hardware output devices, such as the display 184, the speakers 190, the climate control actuators 224, and the Bluetooth module 208. At 352, the adjusting module 260 may increment the one of the entries of the probabilities index 256 (e.g., by the first predetermined increment amount). Control may then end. If 344 is false, control may continue with 356.

At 356, in response to user input to not execute the secondary intent 252, the adjusting module 260 may decrement the one of the entries of the probabilities index 256 (e.g., by the first decrement increment amount). At 360 the secondary intent module 248 may determine other possible secondary intents for one or more other domains. For example, based on the domain of the primary intent 240, the secondary intent module 248 may identify the N entries in the row for the domain of the primary intent 240 having the N next highest probabilities and the N domains for those N entries. The secondary intent module 248 may set the possible secondary intents, for example, by matching the remaining portion of the voice input 232 with the respective predetermined intents of the N domains.

At 364, the display control module 212, at the request of the execution module 244, may display a request for user input indicative of whether to execute the possible secondary intents on the display 184. The display control module

212 may display the N possible secondary intents, for example, in descending order of the respective probabilities of the N domains.

At 368, the execution module 244 may determine whether the user has requested execution of one of the possible secondary intents. The user may request execution of one of the possible secondary intents, for example, by voice, via one of the user input devices 186, or via the display 184. If 368 is true, the execution module 244 executes the one of the possible secondary intents at 372 via one or more of the hardware output devices, such as the display 184, the speakers 190, the climate control actuators 224, and the Bluetooth module 208. At 376, the adjusting module 260 may increment the one of the entries of the probabilities index 256 (e.g., by the second predetermined increment amount). Control may then end. If 344 is false, control may end. While the example of ending is provided, FIG. 3 is an example of one control loop and control may return to 304 and await a next voice input.

Based on a-priori information about transitions between two domains, the system can more accurately arbitrate between command and control grammars or NLU. Additionally, a-priori information about a probability of transitioning between two intents (stored in the probabilities index 256), arbitration between whether to perform the speech recognition (e.g., determine the primary and/or secondary intents) within the vehicle or at a remote server may be more accurate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An infotainment system of a vehicle, comprising:
a voice module configured to, in response to user input, record a voice input received via a microphone;
a primary intent module configured to determine a primary intent included in the voice input using automated speech recognition (ASR);
an execution module configured to, via a first hardware output device of the vehicle, execute the primary intent;
a secondary intent module configured to:
based on the primary intent, determine a first domain of the primary intent;
based on the first domain of the primary intent, determine a second domain using a probabilities index including probabilities for second domains indexed by first domains including:
from the probabilities index, based on the first domain, identifying one of the second domains having a highest probability; and
setting the second domain to the one of the second domains having the highest probability; and
based on the voice input and the second domain, determine a secondary intent included in the voice input using ASR; and
a display control module configured to display on a display a request for user input indicative of whether to execute the secondary intent,
wherein the execution module is further configured to, via a second hardware output device of the vehicle, execute the secondary intent in response to user input to execute the secondary intent,
wherein:
the secondary intent module is further configured to:
in response to user denial of the secondary intent, based on the first domain of the primary intent, determine a third domain; and
based on the voice input and the third domain, determine a possible secondary intent included in the voice input using ASR; and
the display control module is further configured to display on the display a second request for second user input indicative of whether to execute the possible secondary intent.

2. The infotainment system of claim 1 wherein the secondary intent is one of a plurality of predetermined intents associated with the second domain.

3. The infotainment system of claim 1 wherein the primary intent is one of a plurality of predetermined intents associated with the first domain.

4. The infotainment system of claim 1 wherein the secondary intent module is configured to:
based on the first domain, from the probabilities index, identify a second one of the second domains having a second highest probability; and
set the third domain to the second one of the second domains having the second highest probability.

5. The infotainment system of claim 1 wherein the display control module is configured to display the request for user input indicative of whether to execute the secondary intent after completion of the execution of the primary intent.

6. The infotainment system of claim 1 wherein the first hardware output device and the second hardware output device each include one of:
one or more speakers of the vehicle;
the display;
a wireless transceiver; and
a climate control actuator.

7. The infotainment system of claim 1 wherein the primary intent module determines the primary intent based on the primary intent being included in the voice input before the secondary intent.

8. An infotainment method for a vehicle, comprising:
in response to user input to the vehicle, by one or more processors of the vehicle, recording a voice input received via a microphone;
determining, by the one or more processors, a primary intent included in the voice input using automated speech recognition (ASR);
by the one or more processors, via a first hardware output device of the vehicle, executing the primary intent;
by the one or more processors, based on the primary intent, determining a first domain of the primary intent;
by the one or more processors, based on the first domain of the primary intent, determining a second domain,
wherein determining the second domain includes, by the one or more processors, based on the first domain of the primary intent, determining the second domain using a probabilities index including probabilities for second domains indexed by first domains including:
by the one or more processors, from the probabilities index, based on the first domain, identifying one of the second domains having a highest probability; and by the one or more processors, setting the second domain to the one of the second domains having the highest probability;

by the one or more processors, based on the voice input and the second domain, determining a secondary intent included in the voice input using ASR;

by the one or more processors, displaying on a display a request for user input indicative of whether to execute the secondary intent;

by the one or more processors, via a second hardware output device of the vehicle, executing the secondary intent in response to user input to execute the secondary intent;

by the one or more processors, in response to user denial of the secondary intent, based on the first domain of the primary intent, determining a third domain;

by the one or more processors, based on the voice input and the third domain, determining a possible secondary intent included in the voice input using ASR; and by the one or more processors, displaying on the display a second request for second user input indicative of whether to execute the possible secondary intent.

9. The infotainment method of claim 8 wherein the secondary intent is one of a plurality of predetermined intents associated with the second domain.

10. The infotainment method of claim 8 wherein the primary intent is one of a plurality of predetermined intents associated with the first domain.

11. The infotainment method of claim 8 wherein determining the third domain includes:

by the one or more processors, based on the first domain, from the probabilities index, identifying a second one of the second domains having a second highest probability; and by the one or more processors, setting the third domain to the second one of the second domains having the second highest probability.

12. The infotainment method of claim 8 wherein displaying the request for user input indicative of whether to execute the secondary intent includes displaying the request for user input indicative of whether to execute the secondary intent after completion of the execution of the primary intent.

13. The infotainment method of claim 8 wherein the first hardware output device and the second hardware output device each include one of:

one or more speakers of the vehicle;

the display;

a wireless transceiver; and a climate control actuator.

14. The infotainment method of claim 8 wherein determining the primary intent includes determining the primary intent based on the primary intent being included in the voice input before the secondary intent.

* * * * *